United States Patent
Nielsen et al.

[11] Patent Number: 5,665,130
[45] Date of Patent: Sep. 9, 1997

[54] RISER TERMINATOR FOR INTERNALLY CIRCULATING FLUID BED REACTOR

[75] Inventors: Bent B. Nielsen; Franco Berruti; Leo A. Behie, all of Calgary, Canada

[73] Assignee: Natural Resources Canada, Ottawa, Canada

[21] Appl. No.: 588,401

[22] Filed: Jan. 18, 1996

[51] Int. Cl.$^6$ ............................................. B01D 45/00
[52] U.S. Cl. ............................ 55/307; 55/459.2; 55/461; 55/464; 55/DIG. 14; 208/161; 422/147
[58] Field of Search .......................... 55/307, 394, 447, 55/454, 459.1, 459.2, 461, 464, DIG. 14; 95/269, 271; 208/161; 422/147

[56] References Cited

U.S. PATENT DOCUMENTS

| | | | |
|---|---|---|---|
| 851,494 | 4/1907 | Chalfant | 55/394 |
| 1,885,645 | 11/1932 | Vawter | 55/461 |
| 2,929,112 | 3/1960 | Massey et al. | 55/461 |
| 3,320,729 | 5/1967 | Stahl | 55/461 |
| 3,710,561 | 1/1973 | Garrone | 55/461 |
| 4,001,121 | 1/1977 | Bielefeldt | 55/461 |
| 4,191,544 | 3/1980 | Boll et al. | 55/390 |
| 4,666,674 | 5/1987 | Barnes | 422/144 |
| 4,721,561 | 1/1988 | Oetiker et al. | 209/144 |
| 5,171,542 | 12/1992 | Sarkomaa | 422/146 |
| 5,259,855 | 11/1993 | Ross, Jr. et al. | 422/147 |
| 5,286,281 | 2/1994 | Bartholic | 95/271 |
| 5,325,823 | 7/1994 | Garcia-Mallol | 122/4 |
| 5,370,789 | 12/1994 | Milne et al. | 208/126 |

*Primary Examiner*—C. Scott Bushey

[57] ABSTRACT

A fenestrated centrifugal terminator is described for use in an internally circulating fluid bed reactor or conventional riser reactor. It includes a tubular member having a straight vertical tubular portion the lower end of which is adapted for attachment to the upper end of a riser tube. The upper end of the vertical tubular portion merges into a substantially semi-circular inverted U-shaped tubular loop and terminating in a downwardly directing opening. A ramp portion of shallow angle is provided in the vertical tubular portion adjacent the inner face of the loop and terminating at the inlet to the loop to thereby create a venturi. Commencing at the end of the ramp portion is a semi-circular divider wall dividing the tubular loop into a larger upper flow channel and a smaller lower flow channel. This divider wall has a plurality of longitudinally spaced lateral slots through which the gas being separated from the solids is discharged. This gas is collected in a chamber beneath the semi-circular divider wall and then discharges through a discharge outlet connected to the lower flow channel. This terminator is capable of separating solids from gas in less than 20 milliseconds with a separation efficiency of at least 99.5%.

10 Claims, 2 Drawing Sheets

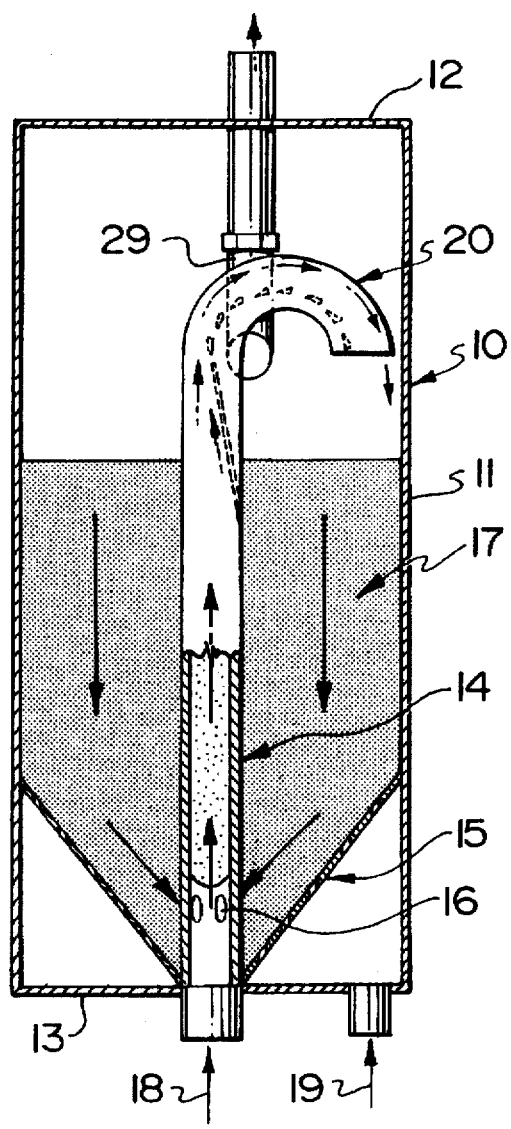
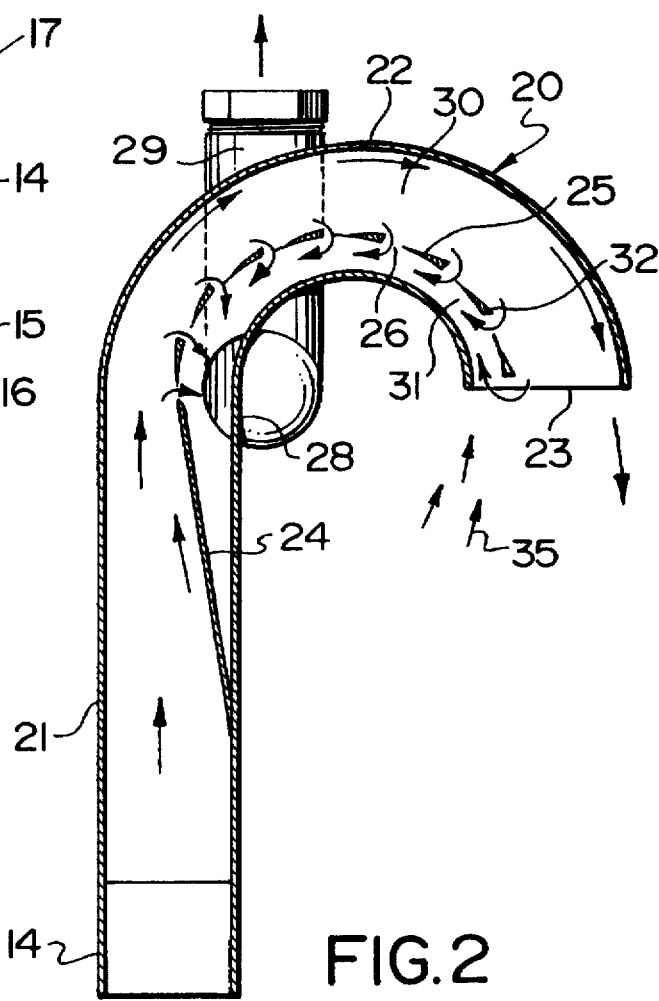
FIG. 1
FIG. 2

RISER TERMINATOR FOR INTERNALLY CIRCULATING FLUID BED REACTOR

BACKGROUND OF THE INVENTION

This invention relates to a separator device for separating a gas/solids mixture rising through a vertical riser tube. It relates more particularly to a fenestrated centrifugal terminator for use in an internally circulating fluid bed reactor.

It has long been recognized that inefficient separation of spent catalyst from the reaction products in a fluidized catalytic cracking unit can lead to after-cracking, with a detrimental impact on the yield structure. Various forms of simple gas/catalyst separation devices were conceived and implemented over the years and these were typically a type of ballistic separator using a tee arrangement at the top of the reactor. An example of such tee arrangement can be seen in Milne et al, U.S. Pat. No. 5,370,789, issued Dec. 6, 1994. Another major concern with internally circulating fluidized bed reactors is the increase in thermal cracking as the riser temperature is raised in search of better product selection. In this instance, not only must the catalyst be rapidly separated from the product vapor, but the vapour residence time must be reduced rapidly to avoid excessive thermal degradation.

A recent separator design that attempts to address the above problems is a new riser terminator developed by Stone and Webster. That terminator is described in an article by Michael A. Silverman entitled "New Stone & Webster FCC Riser Terminator" published in the Circulating Fluidized Bed-4 (CFB4) Conference Preprints, Somerset U.S.A. (1993) pp 479–483. This new terminator was able to decrease the residence time from riser outlet to cyclone outlet from 24.4 to 5.5 seconds. It also showed a residence time of 0.7 seconds from the riser outlet to inertial separator vapor outlet.

Because of the very high riser velocities and mass fluxes that are used in commercial riser reactors or internally circulating fluid bed reactors, an even faster separation of solids and gases would be desirable. It is also important that exceedingly short separation times be accomplished with very high separation efficiencies.

It is the object of the present invention to provide a centrifugal terminator with residence times as low as 20 milliseconds or lower, combined with a solids separation efficiency of 99.5% or greater.

SUMMARY OF THE INVENTION

The separator device of the present invention is designed for separating a gas/solids mixture rising through a vertical riser tube. The separator device is in the form of a terminator comprising a tubular member having a straight vertical tubular portion the lower end of which is adapted for attachment to the upper end of a riser tube (i.e. riser reactor). The upper end of the vertical tubular portion merges into a substantially semi-circular inverted U-shaped tubular loop and terminating in a downwardly directing opening. A ramp portion of shallow angle is provided in the vertical tubular portion adjacent the inner face of the loop and terminating at the inlet to the loop to thereby create a venturi. Commencing at the end Of the ramp portion is a semi-circular divider wall dividing the tubular loop into a larger upper flow channel and a smaller lower flow channel. This divider wall has a plurality of longitudinally spaced lateral slots through which the gas being separated from the solids is discharged. This gas is collected in a chamber beneath the semi-circular divider wall and then discharges through a discharge outlet connected to the lower flow channel.

With the above system, the ramp portion serves as a flow accelerator thus creating a venturi effect. According to a preferred embodiment, there is also a second venturi section associated with the lateral slots. This second venturi comprises small upstanding lips or deflectors on the upstream edge of each slot and this combination of the initial venturi together with the second venturi section provides a differential pressure which promotes the incremental separation of gas and solids, making possible an extremely high separation efficiency in a very short time.

The ramp entry to the first venturi is preferably set at a quite sallow angle, e.g. about 5° to 15°, to ensure that the solid particles strike the outer surface of the loop at a shallow angle in order to minimize ricocheting. This ramp also serves to increase the velocity of the solid particles in order to boost the centrifugal force that helps separate the solid particles and gas. As the mixture passes through the larger upper flow channel, the solid particles are forced to the outside (i.e. outside) by centrifugal force, while the gas is drawn off in stages through the lateral slots (i.e. inside).

By using stagewise bleeding off of gas through use of the venturi effect, at no point is there a large gas flow that can entrain and carry over solid particles. This separation device was designed using the principles found in the Bernoulli Equation:

$$\frac{1}{2}(v_2^2 - v_1^2) + \int_1^2 \frac{dp}{\rho} + (\phi_2 - \phi_1) = 0$$

where:
$\phi$ is potential energy at point i, $m^2/s^2$
$v_i$ is velocity at point i, m/s
p is pressure, $N/m^2$
$\rho$ is density, $kg/m^3$.

Because the lower flow channel has a smaller volume than the upper flow channel through the loop, there is a higher gas velocity in the lower flow channel. From the above Bernoulli Equation, it can be seen that this higher gas velocity in the lower flow channel means that the pressure must be lower in this region, thereby creating a pressure gradient forcing gas flow into the lower flow channel. The divider wall is preferably located between about one quarter the diameter of the tube and the central axis of the tube.

The lateral slots are typically spaced from each other by a distance of about 5 to 50 mm. The length of each slot depends upon the width of the semi-circular divider wall and the width of each slot is typically in the range of about 1 to 4 mm. The divider wall forms a ramp that slopes towards the outside of the inverted U-shaped tubular loop. The upstanding lip on the upstream edge of each slot preferably has a width approximately equal to the width of the slot itself. These lips are preferably set at an angle of about 5° to 50° relative to the tangent at the curved wall for each lip.

The riser terminator of this invention has been found to be capable of carrying out the solids/gas separation in less than 20 milliseconds with a separation efficiency of at least 99.5%. This has been achieved while operating at temperatures ranging from 20° C. to 940° C., with riser velocities of 8 to 11 m/s and mass fluxes ranging from 67 to 257 $kg/m^2.s$.

The novel terminator of this invention is particularly valuable for separating high value gas products, such as olefins, gasoline, etc., from solids, e.g. inerts or catalysts. After the terminator, the gas is quickly quenched to prevent product degradation.

BRIEF DESCRIPTION OF THE DRAWINGS

The invention will be further described with reference to the accompanying drawings wherein:

FIG. 1 is a schematic elevational view, in section, of an internally circulating fluidized bed with the terminator of the invention installed;

FIG. 2 is a schematic elevational view of the riser terminator of the present invention;

DETAILED DESCRIPTION OF THE PREFERRED EMBODIMENT

Figure 3:
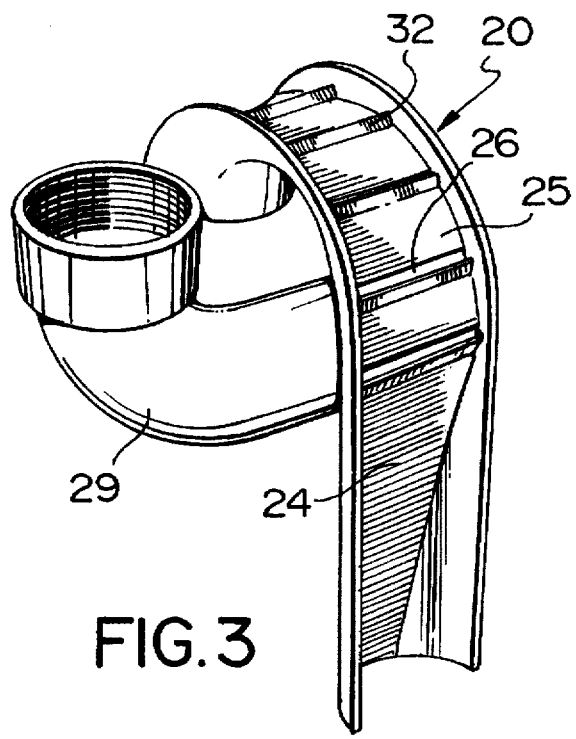
FIG. 3 is a perspective view of a partially assembled riser terminator.
Figure 4:
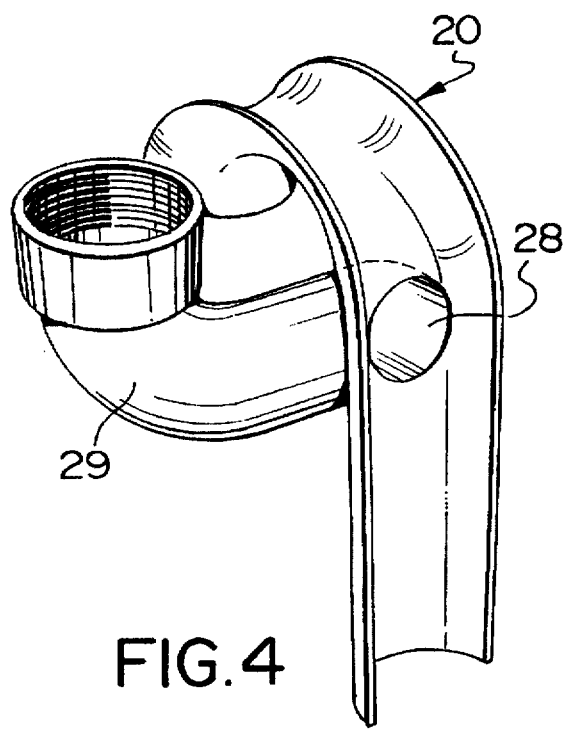
FIG. 4 is a further perspective view of a partially assembled riser terminator.
Figure 5:
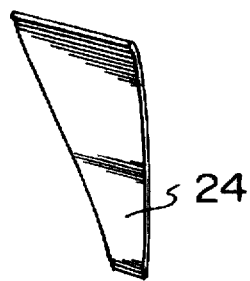
FIG. 5 is a perspective view of a ramp portion.
Figure 6:
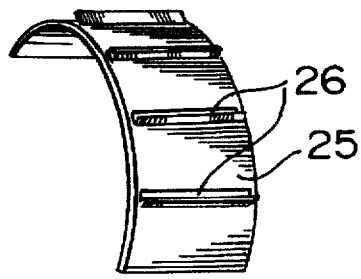
FIG. 6 is a perspective view of a fenestrated divider wall.

A typical internally circulating fluidized bed is shown in FIG. 1, comprising a reactor 10 having an elongated pressure resistant shell or wall 11 with a top wall 12 and a bottom wall 13. Mounted axially within the shell 11 is a tubular riser or draft tube assembly 14 which extends to the bottom wall 13 and upwardly into an upper region of the shell 11. An annular chamber 17 containing a downwardly moving bed of particulate solids is formed between the riser assembly 14 and the reactor shell 11 and this annular space is closed at the bottom end by means of an inverted conical gas/steam distributor wall 15 having perforations permitting aerating gas to pass upwardly therethrough. The aerating gas or steam is fed upwardly within the annular chamber 17. The riser also includes a plurality of orifices 16 serving as inlets for the particulate material contained in the annular chamber 17 to move into the riser 14. Gas feed or reactant is fed in through bottom inlet 18 and inert gas is fed in through inlet 19.

The centrifugal terminator of the invention 20 is attached to the top end of riser tube 14 and is shown in greater detail in FIG. 2. Thus, it includes a vertical tubular portion 21 in which is mounted a ramp 24 to create a venturi. This ramp 24 is installed at an angle of about 5° to 50° and typically about 10°.

The top end of tubular portion 21 merges into a generally semi-circular inverted U-shaped tubular loop 22 with a downwardly directed outlet 23. The loop 22 is divided by way of a generally semi-circular wall 25 into a larger upper flow channel 30 and a smaller lower flow channel 31. The divider wall 25 contains a plurality of uniformly spaced lateral slots 26 each preferably having an upstanding lip portion 32 on a leading or upstream edge thereof.

The tube 22 also contains an opening 28 extending into the smaller lower flow channel 31 for drawing off gas which has passed through the slots 26 and into the channel 31. This opening 28 is connected to a discharge tube 29 through which the separated gas is removed.

A further understanding of this invention may be facilitated by reference to the following examples.

EXAMPLE 1

A test was conducted on a pilot plant centrifugal terminator as shown in FIG. 2. This terminator had an internal diameter of 34.9 mm, with an inclined venturi ramp set at an angle of 10° and having a length of 110 mm. The semicircular divider wall was positioned approximately 16 mm from the bottom edge of the loop and this divider wall contained slots having a width of 3.2 mm and spaced from each other by a distance of 16 mm. The upturned lip on the leading edge of each slot had a height of approximately 3 mm.

The above pilot plant centrifugal terminator was used to separate 12/20 Tyler mesh sand particles from a gas. A mixture of sand particles and gas was fed through the separator at a temperature of 20° C., using a variety of riser velocities and mass fluxes.

The results obtained are shown in Table 1 below:

TABLE 1

| Size of Sand | | Bed Mass Flow | Riser Gas | Riser Solids | |
|---|---|---|---|---|---|
| Tyler Mesh | mm | Rate (g/s) | Velocity (m/s) | Flux (kg/m$^2 \cdot$ s) | % Solids Recovery |
| 12/20 | 1.41– 0.843 | 108 | 8.9 | 113 | 99.638 |
| | | 64 | 8.7 | 67 | 99.985 |
| | | 190 | 10.2 | 198 | 99.993 |
| | | 140 | 9.5 | 147 | 99.064 |
| | | 226 | 11.0 | 237 | 99.997 |

Separation times were less than 20 milliseconds and it can be seen that the separation efficiency was over 99%, with a solids recovery as high as 99.997% using a riser velocity of 11 m/s and a mass flux of 237 kg/m$^2 \cdot$s.

EXAMPLE 2

A further test was conducted using the same pilot plant as in Example 1.

However, for this test smaller 20-40 Tyler mesh sand particles were separated. A mixture of the sand particles and gas was fed through the separator at a temperature of 20° C., again using a variety of riser velocities and mass fluxes.

The results obtained are shown in Table 2 below:

TABLE 2

| Size of Sand | | Bed Mass Flow | Riser Gas | Riser Solids | |
|---|---|---|---|---|---|
| Tyler Mesh | mm | Rate (g/s) | Velocity (m/s) | Flux (kg/m$^2 \cdot$ s) | % Solids Recovery |
| 20/40 | 0.843– 0.373 | 145 | 11.0 | 151 | 99.698 |
| | | 112 | 8.6 | 117 | 99.974 |
| | | 92 | 7.7 | 96 | 99.084 |
| | | 230 | 8.2 | 240 | 99.966 |
| | | 246 | 10.5 | 257 | 99.853 |

Separation times were less than 20 milliseconds and it can be seen that the separation efficiencies were mostly above 99%, and as high as 99.974%.

Claims:

1. A separator device for separating a gas/solids mixture rising through a vertical riser tube, said separator device comprising a tubular member having a straight vertical tubular portion the lower end of which is adapted for attachment to the upper end of said riser tube and the upper end of which merges into a substantially semi-circular inverted U-shaped tubular lop and terminating in a downwardly directed opening, said U-shaped loop having an upper surface and a lower surface, a ramp portion of shallow angle in said vertical tubular portion adjacent said loop lower surface and terminating at the inlet to said loop to thereby create a venturi, a semi-circular wall dividing said tubular loop into a larger upper flow channel and a smaller lower flow channel, said divider wall commencing adjacent the highest point of said venturi ramp portion and having therein a plurality of longitudinally spaced lateral slots, and a gas discharge outlet in said lower flow channel for removing separated gas therefrom.

2. A separator according to claim 1 wherein the ramp portion is at an angle of about 5°–50° relative to the longitudinal axis of the tube.

3. A separator according to claim 2 wherein each slot has a width of about 1 to 4 mm.

4. A separator according to claim 3 wherein the slots are spaced from each other by a distance of about 5 to 50 mm.

5. A separator according to claim 2 wherein each slot has an upturned lip extending along the leading edge thereof.

6. A separator according to claim 5 wherein the lip is at an angle of about 5° to 50° relative to the tangent at the curved wall for each lip.

7. A separator according to claim 6 wherein each said lip has a width no greater than the width of the adjacent slot.

8. A separator according to claim 2 wherein the divider wall is positioned below the central axis of the tube.

9. A separator according to claim 8 wherein the divider wall is positioned between about one quarter the diameter of the tube and the central axis of the tube.

10. A separator according to claim 2 wherein the gas discharge outlet is connected to a gas discharge tube.

* * * * *